Aug. 27, 1963

N. DAMON 3,102,173

ELECTRICAL CONTROLS

Filed Dec. 12, 1958

2 Sheets-Sheet 1

INVENTOR
NEIL DAMON
BY Louis L. Orenbuch
ATTORNEY

Aug. 27, 1963 N. DAMON 3,102,173
ELECTRICAL CONTROLS
Filed Dec. 12, 1958 2 Sheets-Sheet 2
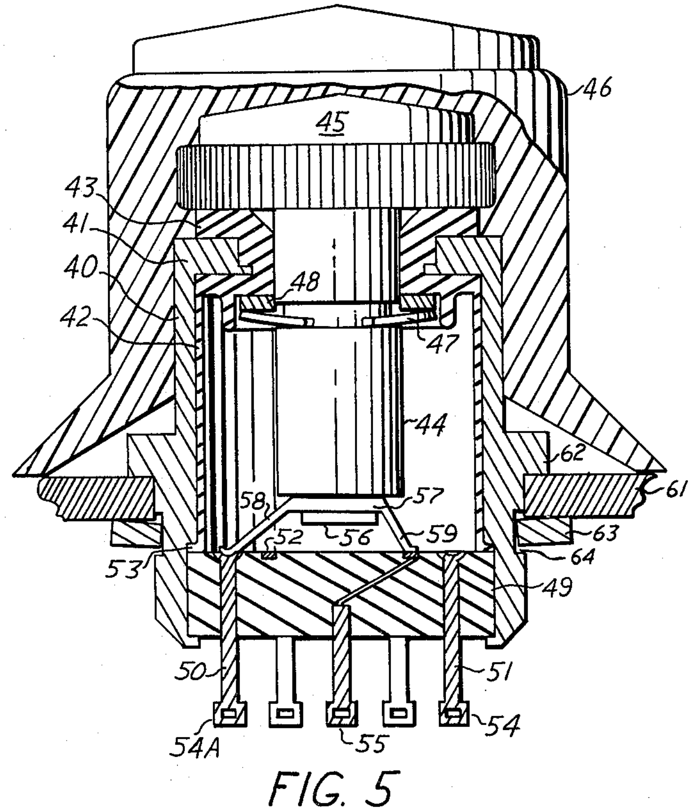
FIG. 5
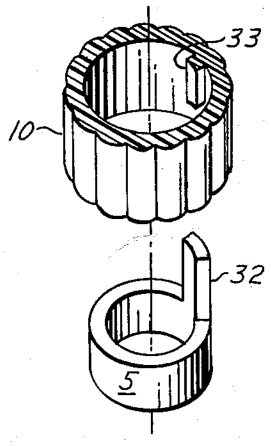
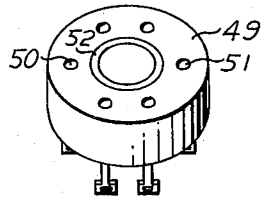
FIG. 6
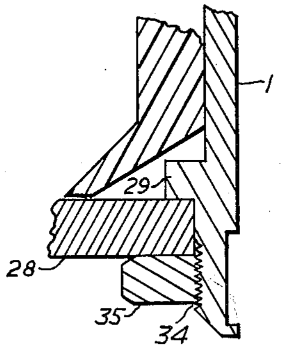
FIG. 4
FIG. 3
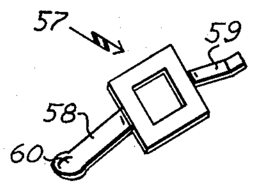
FIG. 7
INVENTOR
NEIL DAMON
BY Louis L. Orenbuch
ATTORNEY 3,102,173
ELECTRICAL CONTROLS
Neil Damon, Sudbury, Mass.
(Tingley Drive, Cumberland, R.I.)
Filed Dec. 12, 1958, Ser. No. 779,934
2 Claims. (Cl. 200—11)

This invention relates to electrical control devices and more particularly pertains to a compact rotary potentiometer or rotary switch constructed so that the knob acts as a housing in which the principal bulk of the control device is contained.

Conventional potentiometers and rotary switches are constructed with a protruding control shaft to which a removable knob is secured by various means such as set screws. Such control devices are commonly provided with a threaded collar surrounding the control shaft and the device is mounted to an electrical chassis by drilling a hole in the chassis large enough to permit entry of the threaded collar and then threading a nut on the protruding collar so that the chassis is pinched between the nut and an enlarged surface of the collar. After the conventional control device has been mounted, the knob is secured to the control shaft and electrical connections are then made to the terminals of the electrical control device. This conventional mounting disposes the housing of the device on one side of the mounting plate with the control knob on the other side. Oftentimes space within the electrical chassis is critical and the bulk of the control housing considerably decreases the space available for the housing of other components. Under crowded conditions it is often very difficult to solder electrical leads to the terminals of the control device without damaging nearby components or burning the insulation from adjacent wires.

This invention treats with a rotary electrical control device whose major bulk is housed within the control knob and which is provided with mounting means requiring only a small portion of the device to protrude into the electrical chassis. The novel control device is designed so that electrical leads may be brought out through a mounting hole in the chassis, the appropriate soldered connections made, and the device then mounted on the chassis by simply snapping a retaining ring into place. In order to demount the control device, it is necessary only to remove one retaining ring, pull the device out of its mounting hole to expose the soldered leads, and unsolder the connected wires. Because only a small portion of the housing of the novel device protrudes into the chassis, critical space is conserved and damage to nearby components during the soldering or unsoldering of leads to the terminals of the electrical device is avoided by performing those operations while the device is demounted from the chassis.

Figure 1:
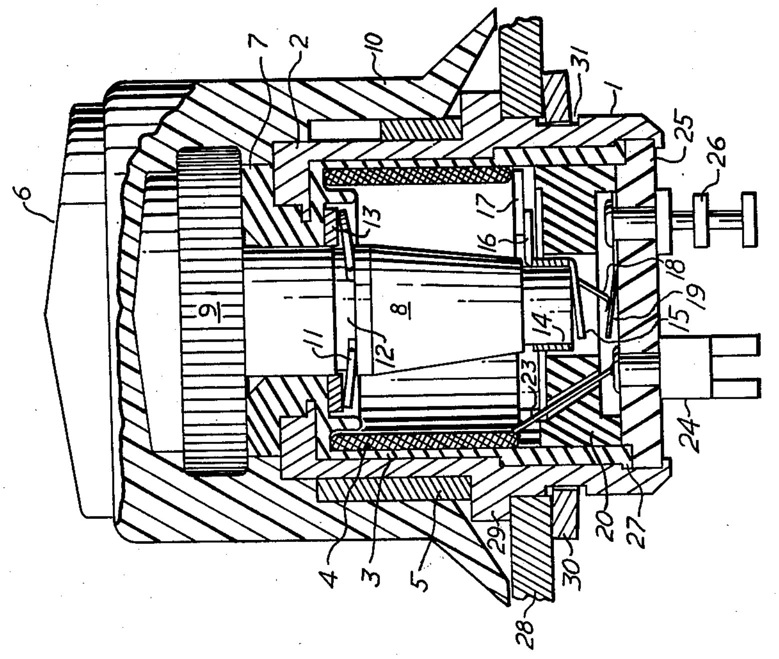
Figure 2:
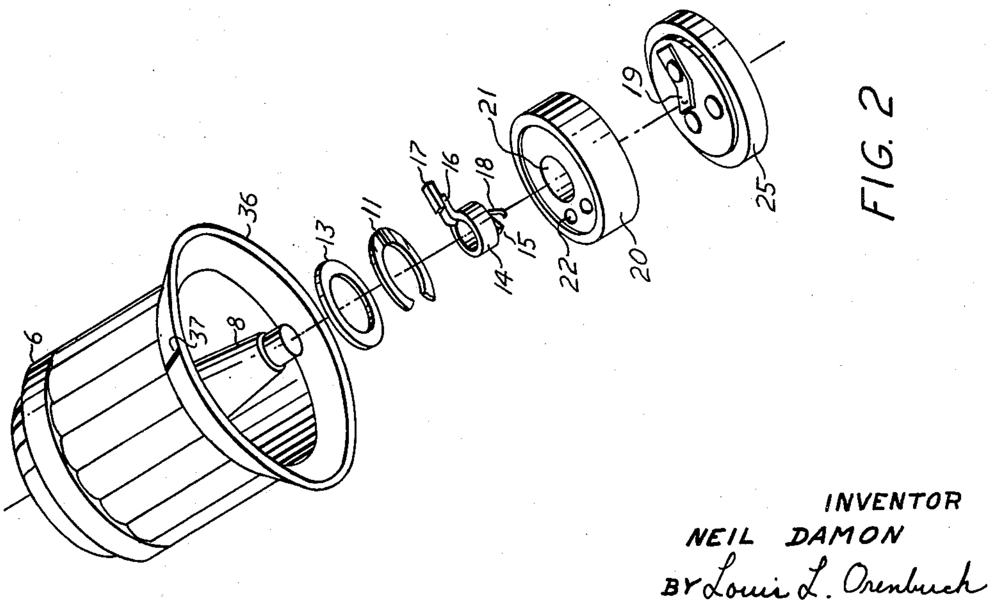

A fuller understanding of the construction of the invention and its manner of operation will be obtained from a perusal of the following detailed description when considered in conjunction with the appended drawings in which:

FIGURE 1 is an elevational sectional view through a potentiometer constructed in accordance with the invention, FIGURE 2 is an exploded view showing some of the interior elements of the potentiometer, FIGURE 3 depicts the means for preventing unlimited rotation of the control shaft, FIGURE 4 depicts a modification of the invention shown in FIGURE 1, FIGURE 5 is an elevational sectional view through a rotary switch constructed in accordance with the invention, and FIGURES 6 and 7 illustrate details of the rotary switch.

Referring now to FIG. 1 which is a sectional view of a preferred form of the invention, there is shown a metallic housing 1, of aluminum for example, which is essentially an open-ended cylinder having an inwardly extending shoulder 2 at its upper end. An insulative liner 3, preferably of a resilient plastic such as Teflon, is coated on the interior wall of the metallic housing. Bonded to the liner by a suitable adhesive is the resistance element 4, which may be a wire having a uniform resistance per unit length, wound upon an annular form or alternatively, may be a resistance card. At its upper end the liner 3 is provided with an integral collar 7 having a central aperture through which projects a shaft 8. The aperture in plastic collar 7 is slightly smaller in diameter than the diameter of shaft 8 whereby the collar grips the shaft and imposes a drag upon that member when it is rotated. The upper end of shaft 8 has an enlarged top 9 in which vertical serrations are provided extending around its periphery. Molded to the upper end of shaft 8 is a knob 6 having a hollow cylindrical skirt 10 which surrounds a substantial portion of the metallic housing 1. The knob is constituted by an electrically insulative material which is preferably a plastic, such as a phenolic resin. In order to prevent the shaft 8 from moving axially, the shaft is locked within the housing by bowed retaining ring 11 of spring steel which fits about an annular groove 12 in the shaft. The retainer 11 is shown in FIG. 2 and is essentially an annulus from which a segment has been removed. A bearing washer 13 is interposed between retainer 11 and the plastic collar to provide a harder bearing surface than is provided by the relatively softer plastic. Because the retainer 11 is bowed it forces the shaft downwardly so that the enlarged end 9 bears upon the upper surface of collar 7. The lower end of shaft 8 is fitted with an electrically conductive contact assembly 14 comprising an annulus from which extend two integral tabs 15 and 16. The contact assembly 14 is secured to the shaft so that the shaft and the assembly rotate as a unit. The upper tab 16 carries a wiper arm 17 which bears against the resistance element 4 so that when the shaft 8 is rotated the arm swings around the resistance element. The wiper arm 17 is fabricated from a material having good electrical conductivity and having adequate toughness to resist the wear imposed by the wiping action. The lower tab 15 has welded to it a bearing finger 18, the free end of which rests upon a center contact 19. The lower end of finger 18 is positioned along the axis of shaft 8 so that the juncture between the finger 18 and the center contact 19 is essentially a coaxial point. Hence, when the shaft is rotated the lower end of finger 18 turns without translatory movement. An insulating spacer 20 is positioned within the liner 2 at the lower end of housing 1. An aperture 21 (FIG. 2) is formed in the spacer 20 through which the finger 18 protrudes. A second aperture 22 in the spacer acts as a conduit for a lead 23 which connects one end of the resistance element 4 to a terminal post 24 secured in an insulative disc 25. In a similar manner the other end of the resistance element may be connected to another terminal post fastened in disc 25. The center contact 19 is secured to a terminal post 26, also fastened to disc 25. By spinning the lower end of housing 1 inwardly over the disc 25, the disc is forced against the rim 27 of the liner to form an air tight seal whereby the lower end of the housing is sealed against the entry of foreign matter such as dust and moisture. In order to secure the potentiometer to a mounting plate 28 as shown in FIGURE 1, a circular hole is drilled in the plate of sufficient size to permit entry of the lower portion of housing 1. A flange 29 on the housing abuts the mounting plate 28 and prevents further insertion of the housing. A bowed retaining ring 30, similar to the retainer 11 but of larger size, is then positioned in an annular groove 31 in housing 1 whereby the mounting plate is pinched between the flange 29 and the ring 30.

An alternative form of securing the potentiometer to the mounting plate 28 is illustrated in FIG. 4. In lieu of the groove 31, the lower end of housing 1 is provided with screw threads 34 on which a nut 35 is engaged to clamp the mounting plate against the flange 29.

To prevent the shaft 8 from turning through a complete revolution, a cylinder 5 is secured to the exterior of housing 1. As shown in FIG. 3, the upper end of cylinder 5 has a protruding circular segment 32. The skirt 10 of the knob fits over cylinder 5 and the interior of the skirt is provided with a spline 33 positioned to be intercepted by the segment 32 wherefore continued rotation of the knob in either direction causes the spline to be brought against segment 32 to prevent the shaft from making a full revolution. In order to obviate any tendency of the housing 1 to rotate with the shaft 8, the housing may be keyed to the mounting plate by a spline or key which is accommodated within a notch provided in the mounting plate. As shown in FIG. 2, the knob 6 is provided with a flared collar 36 on which there is engraved an indexing line 37. It is contemplated that, in accordance with conventional practice, the mounting plate to which the potentiometer is secured will bear suitable markings with which the indexing line 37 may be aligned. The knob 6 may be constructed without the flared collar 36, however, where an indexing line is not deemed necessary.

Referring now to FIG. 5, there is illustrated an embodiment of the invention in the form of a multiple station rotary switch. The metallic housing 40, preferably fabricated of aluminum, is an open-ended cylinder provided with an inwardly extending shoulder 41 at its upper end. The interior of the housing is preferably coated with a resilient plastic such as Teflon or nylon to form an adherent insulative liner 42. At its upper end the plastic liner is formed into an integral collar 43 having a central aperture which receives a shaft 44. The internal diameter of the collar 43 is slightly smaller than the diameter of the shaft whereby the resilient collar grips the shaft with sufficient force to impose a drag when that member is rotated. The upper end of shaft 44 has an enlarged top 45 whose periphery is knurled. A knob 46 of insulative material is molded around the enlarged top 45 so that the knob and the shaft are integrated. Knob 46 is provided with a hollow cylindrical skirt which surrounds a substantial portion of the metallic housing 40. In order to prevent axial movement of shaft 44, a bowed retaining ring 47 of spring steel is inserted in a groove in the shaft and bears upon a bearing washer 48 interposed between the retaining ring and the plastic collar 43. The retaining ring 47 forces the shaft downwardly so that the enlarged top 45 rests against the upper surface of collar 43. The lower end of the housing 40 is closed by a disc 49 constituted by an insulative material in which there are embedded a plurality of contacts, exemplified by the contacts 50, 51. By spinning the lower end of housing 40 inwardly over disc 49, the disc is forced against the rim 53 of the plastic liner forming an air tight seal whereby the housing is sealed against the entry of dust, moisture or other foreign substances. From the sectional view shown in FIG. 5 it can be seen that each of the contacts 50, 51 includes a stem which projects through the lower end of disc 49 and is terminated by a lug 54, 54A. The upper end of each contact is terminated in a concave surface which forms a recess in the upper surface of the disc. A ring 52, more clearly shown in FIG. 6, is embedded in the matrix forming disc 49 and a terminal post 55 provides an exterior electrical connection to the ring 52. The lower end of shaft 44 is terminated in a squared portion 56 to which is secured a contact assembly 57 comprising a frame, shown in FIG. 7, having a long arm 58 and a shorter arm 59. The arm 58 is terminated by a cup 60 which is contoured to fit within the concave surface of the contacts 51, 52. The contact assembly 57 is fabricated from a resilient conductive metallic material and the arms are, in effect, leaf springs. The shorter arm 59 rides upon the conductive ring 52, as indicated in FIG. 5. The plurality of contacts are arranged, as shown in FIG. 6, about a circle concentric with the ring 52 whereby when shaft 44 is rotated, the arm 58 is swung in an arc until the cup 60 drops into the recess in the upper surface of a contact. Thus the contacts act as detents as well as electrical conduits. By rotating the shaft through a full circle, the arm 58 is successively brought to bear upon the contacts. The rotary switch illustrated in FIG. 5 is secured to a mounting plate 61 having a circular hole therein of sufficient size to permit the lower portion of housing 40 to protrude through the plate. The housing 40 is provided with a flange 62 which abuts the mounting plate and restricts further insertion of the housing. By positioning a bowed retaining ring 63 in an annular groove 64 in housing 40, the mounting plate is squeezed between the flange 62 and the retainer 63. Of course, in lieu of the groove 64 and the retainer 63, a threaded connection of the type shown in FIG. 4 may be substituted.

While several preferred embodiments of the invention have been illustrated, it is to be understood that modifications in the structures shown may be made or other embodiments constructed without departing from the essence of the invention. For example, while the knob 6 and shaft 8, shown in FIG. 1, have been described as separate elements which are joined together, it is quite feasible to mold the knob and shaft as a single unit by employing a suitable plastic material. Therefore, it is intended that the invention not be limited to the specific structures illustrated but that the scope of the invention be construed in accordance with the appended claims.

What is claimed is:

1. An electrical control device comprising a hollow cylindrical housing, a resistance element disposed in said housing, an insulative liner secured to the interior wall of said housing, said liner isolating said element from said housing, a control shaft, said shaft extending into said housing, said liner including a collar surrounding a portion of said shaft thereby closing the upper end of said housing, a knob united with said shaft whereby said knob and shaft form an integral unit, said knob having a depending skirt enclosing a substantial portion of said housing, a contact assembly in said housing secured to said shaft, said assembly having a wiper arm bearing on said resistance element, means electrically connecting said assembly to a terminal, an insulative disc closing the lower end of said housing, said terminal being secured to said disc, said housing having an exterior flange adjacent the edge of the dependent skirt, the flange being of larger diameter than the greatest diameter of the portion of the housing below the flange, and means on the lower end of said housing for pinching an interposed member against said flange.

2. A rotary switch comprising a hollow cylindrical housing, said housing at its upper end having a collar secured thereto, said collar having a central aperture therein, a control shaft, a knob united to one end of said control shaft, said knob including a depending skirt enclosing a substantial portion of said housing, said shaft extending through said central aperture into said housing, a contact assembly in said housing, said assembly being keyed to the free end of said control shaft, an insulative disc closing the lower end of said housing, an electrically conductive ring secured on the interior surface of said disc, a plurality of electrical contacts in said housing concentric with said ring, said electrical contacts being embedded in said disc, each of said contacts having a recess therein, said contact assembly including a first arm riding upon said ring and a second arm adapted to bear upon said electrical contacts, said second arm being provided with means adapted to cooperate with the recesses in said contacts whereby said second arm and said contacts function as detents, means on said disc providing exterior electrical connection to said ring and said contacts, said housing providing an external abutment extending beyond the portion of the housing below the abutment to provide an external face immediately below the depending skirt, and means on the lower end of said housing for clamping an interposed member against the external face of said abutment.

References Cited in the file of this patent

UNITED STATES PATENTS

| | | |
|---|---|---|
| 2,041,414 | Johnson | May 19, 1936 |
| 2,090,505 | Uhle | Aug. 17, 1937 |
| 2,132,594 | Arvin | Oct. 11, 1938 |
| 2,144,707 | Ramsey | Jan. 24, 1939 |

| | | |
|---|---|---|
| 2,177,285 | Schellenger | Oct. 24, 1939 |
| 2,206,882 | Davis | July 9, 1940 |
| 2,402,736 | Davis | June 25, 1946 |
| 2,543,373 | Nesson | Feb. 27, 1951 |
| 2,576,044 | Richman et al. | Nov. 20, 1951 |
| 2,814,679 | Leff et al. | Nov. 26, 1957 |
| 2,909,749 | Banden et al. | Oct. 20, 1959 |
| 2,954,443 | Diggens et al. | Sept. 27, 1960 |
| 2,974,299 | Youngbeck et al. | Mar. 7, 1961 |

FOREIGN PATENTS

| | | |
|---|---|---|
| 18,775 | Switzerland | Feb. 1, 1899 |
| 877,749 | France | Sept. 14, 1942 |
| 922,583 | France | Feb. 3, 1947 |